United States Patent [19]

Roberts

[11] 4,312,297
[45] Jan. 26, 1982

[54] FEEDER ATTACHMENT FOR GRAIN WAGONS

[76] Inventor: Leland L. Roberts, Rte. 1, Kirksville, Mo. 63501

[21] Appl. No.: 161,209

[22] Filed: Jun. 19, 1980

[51] Int. Cl.³ .............................................. A01K 5/00
[52] U.S. Cl. ...................................................... 119/53
[58] Field of Search ........................ 119/52 R, 53, 53.5, 119/54, 58, 60, 61; 296/15; 298/24, 27, 28

[56] References Cited

U.S. PATENT DOCUMENTS

| | | | |
|---|---|---|---|
| 247,346 | 9/1881 | Hendriek | 119/58 |
| 390,259 | 10/1888 | Schwartz | 119/58 |
| 1,829,108 | 10/1931 | Petersen | 119/61 |
| 3,067,722 | 12/1962 | Strong | 119/53.5 |
| 3,565,044 | 2/1971 | Sorrels | 119/53 |

Primary Examiner—Hugh R. Chamblee
Attorney, Agent, or Firm—Lowe, Kokjer, Kircher, Wharton & Bowman

[57] ABSTRACT

A feed trough attachment for converting a grain wagon into a portable cattle feeder. The trough is equipped with a pair of mounting arms which are bolted to the frame of the grain wagon to mount the trough below the gravity discharge outlet opening of the grain box.

10 Claims, 2 Drawing Figures

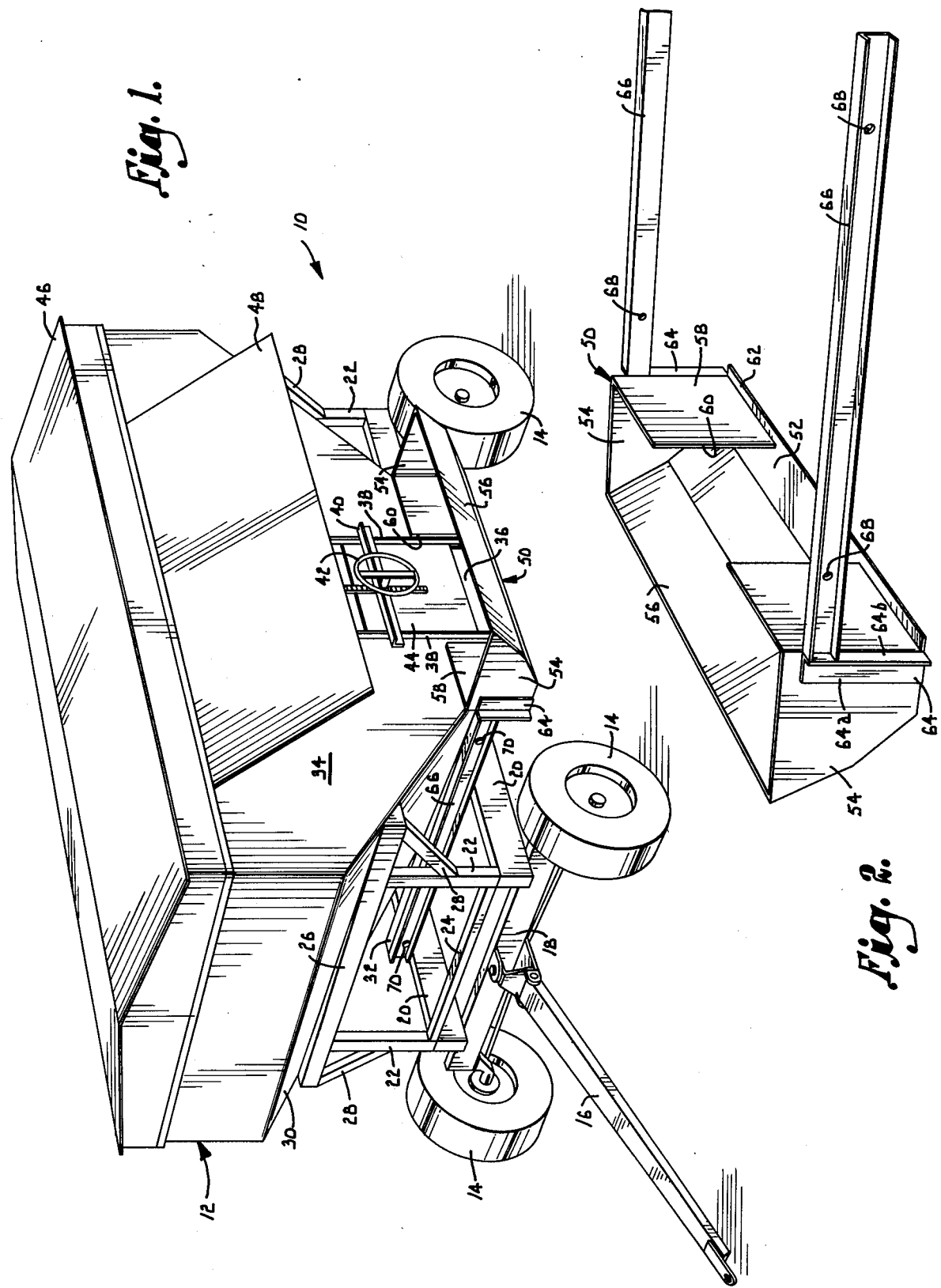

FEEDER ATTACHMENT FOR GRAIN WAGONS

BACKGROUND OF THE INVENTION

This invention relates in general to feed troughs and deals more specifically with a detachable feed trough for converting a grain carrying wagon into a feeder for cattle and other animals.

Grain wagons having gravity discharge grain boxes are widely used for carrying grain. Typically, the grain is loaded into the grain box and is carried to an elevator where it is unloaded from the grain box through a gravity discharge chute. It has been proposed to construct grain carriers such that they also serve as feeders for cattle and other animals. However, the combination grain carriers and feeders that have been developed in the past are not entirely satisfactory in all respects. Perhaps most notably, the carrying of grain and its discharge into a grain elevator is not carried out as easily with combination units as with grain wagons which are specially constructed solely for that purpose. When the combination unit is used to feed animals, an adequate supply of feed material is not always present in the feed trough. As a result, effective feeding of the animals does not always occur.

The present invention provides a feed trough which may be detachably mounted to a standard grain wagon to convert it to a feeder for animals. The trough is located beneath the gravity discharge outlet of the grain box where it automatically receives an adequate supply of feed. The trough can be easily removed from the grain box when the grain wagon is to be used to haul grain to an elevator or another location.

It is an important object of the invention to provide a feed trough which may be quickly and easily mounted to a grain wagon beneath the gravity discharge outlet of the grain box such that the feed discharges by gravity into the trough for feeding of cattle.

Another object of the invention is to provide a feed trough of the character described which is readily detachable from the grain wagon to permit the wagon to be used as a grain carrier. Since the grain wagon is constructed specifically for use as a grain carrier, it is better suited to haul and discharge grain than existing combination units which are designed to also act as feeders.

Still another object of the invention is to provide a feed trough of the character described which is constructed and mounted in a sturdy manner in order to withstand the loads and forces applied to it. The trough and its mounting structure are strong enough to readily handle large quantities of feed and to withstand the forces of cattle bumping against the unit.

An additional object of the invention is to provide a feed trough of the character described which is readily adapted for attachment to a standard grain wagon without requiring significant modification of the grain box or wagon. The only modification required prior to attachment of the feed trough is removal of the grain chute, and this can be accomplished quickly and with little difficulty.

A further object of the invention is to provide a feed trough attachment for a grain wagon that is simple and economical to construct and which avoids spillage and other loss of feed.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith and in which like reference numerals are used to indicate like parts in the various views:

FIG. 1 is a perspective view of a grain wagon which is equipped with a detachable feed trough constructed according to a preferred embodiment of the present invention; and FIG. 2 is a perspective view of the feed trough detached from the grain wagon.

With initial reference to FIG. 1, numeral 10 generally designates a conventional grain wagon. The grain wagon includes a grain box 12 which is mounted on wheels 14. A draw bar 16 extends from the front axle 18 to permit the wagon to be towed by a tractor or another vehicle (not shown).

A frame structure which supports grain box 12 includes a pair of longitudinal beams 20 which are mounted on the axles of the wagon. Upright posts 22 are mounted to the opposite ends of each beam 20, and the posts in each pair are interconnected by a cross brace 24. A horizontal beam 26 is mounted to extend between the top ends of the pairs of posts 22, and an angled brace 28 extends from each post 22 to connection with the outer end of beam 26. Beams 26 engage inclined portions 30 of the front and rear panels of grain box 12 to assist in supporting it. A pair of spaced apart horizontal beams 32 (only one of which is visible in FIG. 1) extend between the longitudinal beams 20. One end of each beam 32 extends outwardly beyond beam 20 and terminates adjacent one side panel 34 of grain box 12. Beams 32 assist in supporting the grain box and particularly the outlet side thereof which is the side defined by the flat vertical panel 34.

The lower portion of side panel 34 is provided with an outlet opening 36. A pair of vertical angles 38 are welded to the outer surface of panel 34 to extend along opposite sides of opening 36. The outlet opening terminates adjacent the bottom panel (not shown) of grain box 12. Extending between the vertical angles 38 is a horizontal angle 40 which receives a hand wheel 42 that may be turned to open and close a gate 44. Gate 44 controls the size of outlet opening 36 and is moved upwardly and downwardly to open and close the outlet when hand wheel 42 is turned. When the grain wagon is used to carry grain to an elevator, a chute (not shown) is mounted to underlie opening 36 in order to direct grain out of opening 36 during unloading.

The top of grain box 12 is covered by a roof structure 46 which is removable from the grain box. An awning 48 extends outwardly from beneath roof structure 46 at a location above outlet opening 36. Awning 48 is inclined such that it angles downwardly as it extends away from side panel 34 of the grain box.

In accordance with the present invention, grain wagon 10 may be converted into a portable cattle feeder by attaching to it a feed trough which is generally designated by reference numeral 50. Trough 50 includes a flat bottom panel 52 and a pair of opposite sides 54. The trough is open at the top and includes a bent front panel 56. A flat back panel 58 of the trough is provided with a rectangular cut out opening 60 which aligns with outlet opening 36 of the grain box when the feed trough is mounted to the grain wagon as shown in FIG. 1. The bottom panel 52 underlies opening 60 and extends rearwardly beyond back panel 58 to provide a small flange 62 which prevents grain from spilling, as will be explained more fully.

A vertical angle bracket 64 is welded to each of the opposite sides 54 of the feed trough. One flange 64a of each angle is welded flatly against side 54, while the other flange 64b of each angle is welded to one end of a horizontal mounting arm 66. Each mounting arm 66 is in the form of a channel having a pair of spaced apart holes 68 extending through its central web portion. Each bolt hole 68 receives a bolt 70 (FIG. 1) when the feed trough is mounted to the grain wagon.

When trough 50 is detached from the grain wagon, the wagon may be used in the normal fashion to carry grain and to discharge the grain into an elevator or the like. The chute (not shown) is attached to the bottom of grain box 12 beneath outlet opening 36, and gate 44 is opened to permit the grain to discharge by gravity out through the outlet opening and along the chute into the grain elevator.

To convert wagon 10 to a portable feeder for cattle and other animals, the chute is removed, and feed trough 50 is mounted to the wagon. This is accomplished by positioning arms 66 adjacent the respective cross beams 32 and using bolts 70 to secure the arms to the beams 32. Feed trough 50 is located with its bottom panel 52 underlying opening 36 in order to receive the feed contained in grain box 12. When the feed trough is mounted in place, cut out 60 registers with the outlet opening 36 and back panel 58 flatly engages side panel 34 of the grain box. Flange 62 extends beneath opening 36 and the bottom panel of the grain box to prevent feed from possibly spilling behind the back of the trough.

Trough 50 is carried low enough to provide cattle and other animals with access through its open top to the feed material contained within the trough. Gate 44 may be opened to the extent desired to maintain an adequate supply of feed in the trough. As the feed is consumed by the animals, it is replenished automatically due to the gravity discharge of feed out of box 12 through opening 36 and into the trough onto its bottom panel 52. In addition, the movement of the animals and their jostling and bumping against the trough assists in maintaining the proper quantity of feed in it. The awning 48 shields the feed in trough 50 from rain and other foreign material.

Trough 50 may be removed from the grain wagon by removing the bolts 70 to release mounting arms 66 from beams 32. The gravity discharge chute (not shown) may then be installed, and the wagon may be used to deliver grain to an elevator or another location in the manner indicated previously.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. A detachable feeder structure for converting a gravity flow grain wagon to a self feeder for animals, said wagon having a grain box with a gravity discharge outlet opening adapted to receive a gravity discharge unloading chute for directing material from the box, said feeder structure comprising:
   a feed trough having a front, a back, opposite sides and a bottom cooperating to form a container having an open top through which animals can feed on material in the container; and
   means for detachably mounting said feed trough to said grain wagon at a location to substantially underlie said outlet opening of the grain box and at an elevation wherein said open top of the trough is accessible to animals, whereby the feed material in said grain box discharge under the influence of gravity into said container for feeding of the animals, said trough being detachable from said wagon to permit same to function as a gravity flow grain wagon.

2. The invention set forth in claim 1, wherein said detachable mounting means comprises:
   a pair of mounting arms secured to said feed trough and projecting therefrom; and
   a plurality of fastening elements for each mounting arm adapted to attach said arms to the grain wagon, said fastening elements being removable to permit removal of the mounting arms and feed trough from the grain wagon.

3. The invention set forth in claim 2, including a pair of brackets attached to said feed trough at spaced apart locations thereon, said mounting arms being rigidly connected with the respective brackets.

4. The invention set forth in claim 2, including:
   a pair of angle brackets rigidly attached to said opposite sides of the trough, said mounting arms being rigidly connected with the respective angle brackets.

5. The invention set forth in claim 1, wherein:
   said outlet opening is located in a side of the grain box adjacent the bottom portion thereof;
   said feed trough has a cut out in said back thereof disposed substantially in alignment with said outlet opening when the trough is mounted to said grain wagon; and
   said bottom of the trough underlies said cut out to receive the feed material discharging from said outlet opening.

6. The invention set forth in claim 5, wherein said bottom of the feed trough extends beyond said back rearwardly thereof and underlies said outlet opening to prevent spillage of the feed material.

7. A detachable feeder structure for converting a gravity flow grain wagon from a grain carrier to an animal feeder, said wagon having a grain box with an outlet opening for gravity discharge of material from the box, said feeder structure comprising:
   a feed trough having a bottom panel, a pair of opposite sides, a back panel and a front portion cooperating to provide a container having an open top through which animals can feed on material contained in the container;
   a pair of spaced apart mounting arms extending from said feed trough; and means for detachably fastening said mounting arms to said wagon to mount said trough at a location to substantially underlie said outlet opening to receive feed material discharging through the opening, said fastening means being detachable to permit removal of said mounting arms and feed trough from the wagon to permit same to function as a gravity flow grain wagon.

8. The invention set forth in claim 7, including a pair of brackets attached to the opposite sides of said feed trough, said mounting arms being rigidly connected with the respective brackets and extending therefrom.

9. The invention set forth in claim 8, wherein each bracket comprises an angle member having a pair of flanges, one flange of each angle member being attached to the corresponding side of the trough and the other flange being connected with the corresponding mounting arm.

10. The invention set forth in claim 7, wherein said back panel of the feed trough engages a side surface of the grain box when said trough is mounted to the wagon, said back panel having a cut out disposed in alignment with said outlet opening of the grain box to direct feed material into the trough when same is mounted to the wagon.

* * * * *